United States Patent [19]

Boghosian

[11] 3,941,915

[45] Mar. 2, 1976

[54] SWITCH RECEPTACLE

[76] Inventor: Paul B. Boghosian, 937 Dickran Drive, Tulare, Calif. 93274

[22] Filed: Aug. 26, 1974

[21] Appl. No.: 500,567

[52] U.S. Cl. ................ 174/48; 200/159 R; 200/296

[51] Int. Cl.² ........................................... H02G 3/22

[58] Field of Search ....... 174/48, 53, 58; 200/51.16, 200/61.61, 61.62, 61.7, 61.73, 61.74, 61.75, 61.76, 153 L, 159 R, 160, 293, 294, 296, 297, 300, 340, DIG. 25

[56] References Cited

UNITED STATES PATENTS

| | | | |
|---|---|---|---|
| 2,738,401 | 3/1956 | Roteman | 200/159 X |
| 2,822,435 | 2/1958 | Schuchard et al. | 200/293 X |
| 2,826,325 | 3/1958 | Johanson | 220/3.9 X |
| 3,724,795 | 4/1973 | Callanan | 174/58 UX |

*Primary Examiner*—Elliot A. Goldberg
*Assistant Examiner*—David A. Tone
*Attorney, Agent, or Firm*—Huebner & Worrel

[57] ABSTRACT

A receptacle for wired push-button switches used to actuate appliances adapted for inclusion in walls under construction, having an elongated tubular body; a removable plug disposed in one end of the body, the plug having an aperture adapted to accept wires threaded therethrough; a flange mounted on the end of the body opposite to the plugged end in circumscribing relation to the body; a mounting plate connected to the flange disposed substantially parallel to the axis of the body and offset therefrom whereby the receptacle serves as a temporary tie-off for wiring and as a permanent receptacle for a push-button switch proper.

8 Claims, 4 Drawing Figures

21 27 28 14 31 30 25 16 32 33

SWITCH RECEPTACLE

BACKGROUND OF THE INVENTION

The present invention relates to a switch receptacle used to actuate appliances and more particularly to such a receptacle adapted for inclusion in walls and the like under construction, the receptacle having a disposably member serving as a tie-off for wires until installation of the switch.

During construction of wall-like structures it is necessary to lay all wiring to outlets, fixtures, conduits, and the like before the wall is completed; the outlets and fixtures are later installed after the wall is finished. The wiring must consequently be strung inside the wall to a pre-designed location by one crew, and after a considerable lapse of time another crew completes the wall construction allowing completion of the electrical connections and the mounting of the outlets, fixtures and the like from outside the wall.

Because of the likelihood of the involvement of different personnel at various stages of construction and time lapses therebetween, confusion many times exists as to the exact placement of the inside wiring. Thus, some type of wiring tie point is useful which is installed during the wall construction and which serves to secure the wires for the later external connection. For conventional 115 volt systems, a variety of conduit and junction boxes are available. Prior art in this area is typified by U.S. Pat. No. 2,640,619 to Schneiderman, U.S. Pat. No. 1,774,934 to Mangin, U.S. Pat. No. 1,675,219 to Kent, and U.S. Pat. No. 2,861,705 to Scott.

Wiring for low voltage appliances such as doorbells, is, of course, separate from the conventional 115 volt system and is especially prone to problems involving tie-off locations. It is also necessary to provide some type of housing or receptacle in the wall to receive the push-button mechanism. Those types of low voltage appliances which use push-button switches can thus benefit from a device which serves as a tie-off point and locater during construction, and also functions as a permanent receptacle for the pushbutton when the latter is installed.

SUMMARY OF THE INVENTION

In view of the foregoing, it is an object of the present invention to provide a push-button receptacle capable of functioning as a wire tie-off and locater as well as a permanent receptacle for the pushbutton.

Another object is to provide a combined switch receptacle and tie-off fixture which is convenient and easy to install.

Another object is to provide such a combined receptacle and fixture which is easily located when a wall in which it is mounted is completed.

Another object is to provide such a combined receptacle and fixture having a removable plug providing an aperture through which wires of an electrical system can be quickly and easily threaded to provide a temporary tie-off.

Another object is to provide such a combined receptacle and fixture about which a wall can be conveniently surfaced.

It is a further object to provide such a receptacle manufactured economically of plastic material or the like.

It is a further object to provide such a receptacle with separable and disposable tie-off means.

These and other objects will become more fully apparent upon reference to the following description and accompanying drawings.

DESCRIPTION OF THE PREFERRED EMBODIMENT

Figure 1:
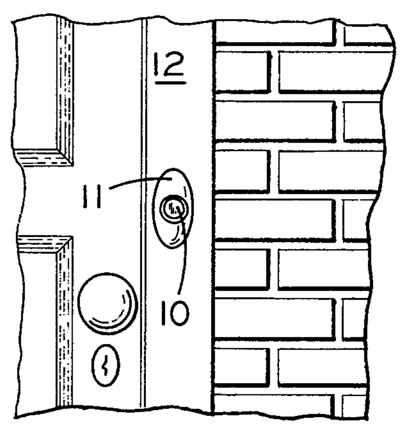
FIG. 1 is a fragmentary front elevation of a wall typifying a usual doorbell switch installation and having the device of the present invention mounted therein.

Referring more particularly to the drawing, a typical doorbell switch installation is illustrated in FIG. 1 showing a doorbell push-button switch 10 mounted within a faceplate 11 on a wall 12.

Figure 2:
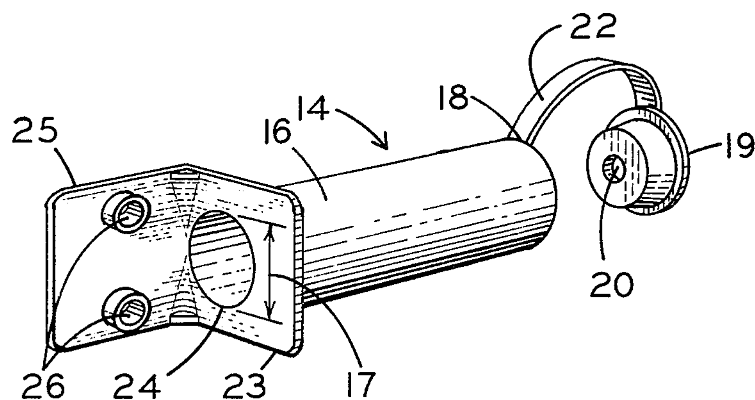
FIG. 2 is a perspective view of a combined push-button receptacle and tie-off fixture embodying the principles of the present invention.
Figure 3:
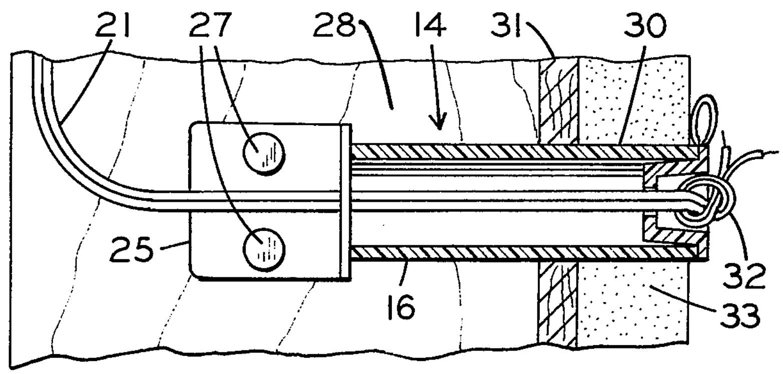
FIG. 3 is a sectional side elevation of a portion of the wall of FIG. 1 and the receptacle as employed as a wire tie-off and locater.
Figure 4:
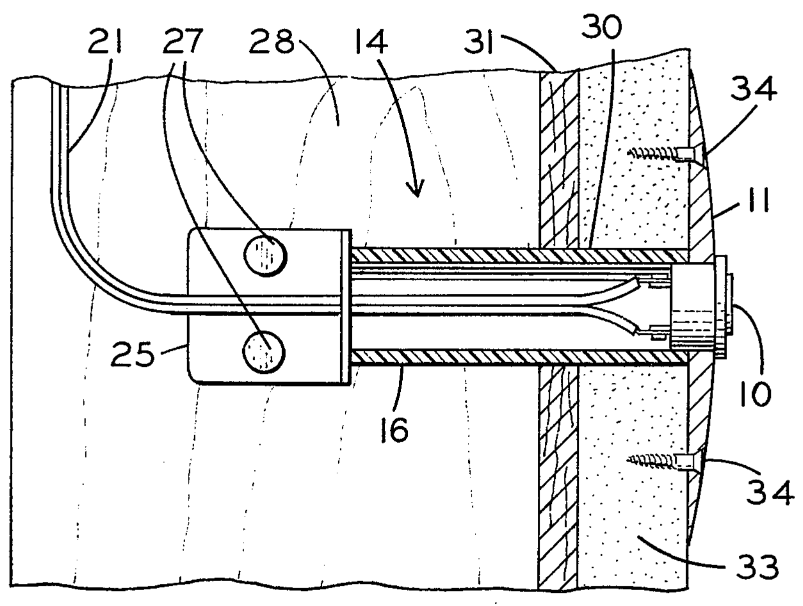
FIG. 4 is a view of the wall and receptacle similar to that of FIG. 3 but as employed as a receptacle with a pushbutton disposed therein.

A receptacle of the present invention is shown generally at 14 in FIGS. 2 through 4. The receptacle is preferably constructed of plastic or some other economical electrically non-conductive material. Even suitably insulated metal may be utilized, if desired. The receptacle has an elongated, cylindrical tubular body 16 having an inside diameter represented at 17 adapted to house a conventional wired push-button switch 10 used in doorbell systems. The push-button switch is frictionally fitted into an end 18 of the body. A removable and disposable plug 19 is initially frictionally fitted in the end 18 prior to installation of the switch therein. The plug has an aperture 20 therethrough adapted to have wires 21 threaded therethrough for tying-off purposes. A flexible strap 22 is preferably connected between the plug 19 and the body 16 so that they do not become inadvertently separated.

A substantially square flange 23, integral with the body 16, circumscribes the end 24 of the body opposite to the plug 19. Integral with the flange is a mounting plate 25 disposed parallel with the axis of the body but offset therefrom and extending away from end 24. The plate is disposed in a plane substantially tangential to the body. The plate has a plurality of holes 26 adapted to receive nails 27 to mount the receptacle to a wall member, such as a stud 28.

OPERATION

The operation of the described embodiment of the subject invention is believed to be clearly apparent and is briefly summarized at this point.

When the construction of a wall 12 has reached an appropriate point, the wires 21 for a doorbell push-button switch 10 are installed and a receptacle 14 is mounted at the desired location. Since the body 16 of the receptacle is cylindrical, this is quickly and easily accomplished by drilling a hole 30 through the surface of the wall, such as wall board 31, adjacent to a stud 28 and sliding the end 18 of the receptacle outwardly therethrough. Nails 27 are then inserted through the holes 26 and driven into the stud 28, securing the receptacle in place.

As best shown in FIG. 3, preliminary to such mounting, the wires 21 are extended through the body 16 and threaded through the aperture 20. A knot 32 is formed in the wires to prevent separation of the wires from the receptacle 14. The receptacle therefore both secures the wires preventing their loss inside the wall and reveals their location at a point on the outside of the wall board 31.

The wall 12 is then completed by applying a surface 33 to the wall board 31. Such surface may consist of wood paneling, veneer or the like, drilled to receive the end 18 of the body 16, or plaster, stucco or texture applied thereabout. In any event, the protrusion of the end 18 of the body through the wall board 31, as well as the disposition of the plug 19, strap 22 and knot 32 prominently disclose the location of the receptacle prior, during and subsequent to the surfacing operations.

When construction of the wall has reached a point where the doorbell system is ready for completion, the knot 32 in the wires 21 is untied. The plug 19 is removed from end 18 and separated from the body 16 as by severing strap 22. The pushbutton switch 10 is then attached in standard fashion to the wires. The faceplate 11 is then secured to the wall 12 by screws 34, as shown in FIG. 4.

The receptacle 14 is economical to produce and fully effective in performing its combined functions of tie-off fixture and switch receptacle. It is quickly, easily and economically installed. It dependably holds the wires 21 in position while the wall 12 is completed. The plug 19 is easily removed and discarded after untying the wires 21. The wires are then readily drawn out of the end 18, affixed to the switch 10 and shoved back into the wall. The switch is friction fit to the body 16 and dependably mounted therein by simple insertion.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. A receptacle for a switch comprising a tubular body for the extension of wires longitudinally therethrough and providing an end dimensioned to receive a switch frictionally fitted thereon, means borne by the tubular body for mounting said body in a wall with said end outwardly disposed, and a plug removably, frictionally fitted on said end of the body and having an aperture through which wires can be extended temporarily to hold the wires in place prior to receipt of a switch on said end.

2. The receptacle of claim 1 in which the body, the mounting means, and the plug are of integral construction.

3. The receptacle of claim 2 in which the plug is connected to the body by means of a flexible strap integral therewith.

4. The receptacle of claim 1 in which the mounting means includes a flat mounting plate integral with the body and parallel to the axis thereof.

5. A receptacle for inclusion in walls and the like during construction thereof to mount a switch and temporarily to secure wires thereto for said switch during construction, the receptacle comprising a tubular body having an end dimensioned releasably to receive a switch; securing means including a plug dimensioned to be received on said end of the body and having an aperture through which wires can temporarily be extended thereby to attach them to the plug; and mounting means connected to the body for attachment of the body to a wall.

6. The receptacle of claim 5 wherein the tubular body includes a mounting flange at the end opposite to the end which is dimensioned releasably to receive a switch.

7. A switch receptacle for inclusion in walls and the like during construction temporarily to secure electric wires for a switch thereto and ultimately to mount such a switch, the receptacle comprising an elongated tubular body adapted to receive such a switch in one end thereof and similarly adapted to receive wires connected to and extending from the switch through the body and emanating from the opposite end thereof; a disposable plug seated in said one end of the body to be discarded when the switch is installed, the plug having an aperture adapted to have wires extended therethrough awaiting installation of the switch; a flange mounted on the body at the end opposite said one end in which the plug is seated; and a plate mounted on the flange disposal parallel with the axis of the body but offset therefrom, the plate having a plurality of holes for nails whereby the receptacle is installed in a wall during construction thereof.

8. A combined switch receptacle and tie-off fixture comprising:

A. an elongated, tubular, cylindrical body having an end adapted releasably to receive a switch in frictionally fitted relation therein;

B. a substantially square flange circumscribing the body and integral therewith at the end thereof opposite to said one end;

C. a mounting plate integral with the flange disposed in a plane substantially tangential to the body;

D. a plug releasably fitted to said one end of the body having an aperture adapted temporarily to receive switch wires in threaded relation therethrough; and E. a flexible severable strap interconnecting the plug and the body.

* * * * *

UNITED STATES PATENT AND TRADEMARK OFFICE

CERTIFICATE OF CORRECTION

PATENT NO. : 3,941,915

DATED : March 2, 1976

INVENTOR(S) : Paul B. Boghosian

It is certified that error appears in the above-identified patent and that said Letters Patent are hereby corrected as shown below:

Column 1, Line 16, delete "pre-designed" and substitute --- pre-designated ---.

Column 4, Line 36, delete "disposal" and substitute --- disposed ---.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*